(12) United States Patent
Maaref et al.

(10) Patent No.: US 12,339,376 B2
(45) Date of Patent: Jun. 24, 2025

(54) USER-AIDED SIGNAL LINE-OF-SIGHT (LOS) MACHINE LEARNING CLASSIFIER

(71) Applicant: oneNav, Inc., Palo Alto, CA (US)

(72) Inventors: Mahdi Maaref, Mountain View, CA (US); Lionel Garin, Palo Alto, CA (US)

(73) Assignee: oneNav, Inc., Sunnyvale, CA (US)

( * ) Notice: Subject to any disclaimer, the term of this patent is extended or adjusted under 35 U.S.C. 154(b) by 427 days.

(21) Appl. No.: 17/806,110

(22) Filed: Jun. 9, 2022

(65) Prior Publication Data

US 2023/0003901 A1    Jan. 5, 2023

Related U.S. Application Data

(60) Provisional application No. 63/309,280, filed on Feb. 11, 2022, provisional application No. 63/285,823, (Continued)

(51) Int. Cl.
*G01S 19/22* (2010.01)
*G01S 19/07* (2010.01)
(Continued)

(52) U.S. Cl.
CPC .............. *G01S 19/22* (2013.01); *G01S 19/07* (2013.01); *G01S 19/23* (2013.01); *G01S 19/428* (2013.01); *G06N 5/022* (2013.01)

(58) Field of Classification Search
CPC .......... G01S 19/22; G01S 19/07; G01S 19/23; G01S 19/428; G06N 5/022
See application file for complete search history.

(56) References Cited

U.S. PATENT DOCUMENTS 5,717,406 A * 2/1998 Sanderford ............... G01S 5/14
                                                                       342/363
9,562,770 B2    2/2017 Garin
(Continued)

FOREIGN PATENT DOCUMENTS

CN    112099058 A  * 12/2020  ............ G01S 19/22
CN    112902989 A     6/2021
(Continued)

OTHER PUBLICATIONS

Hartrampf, Mark et al. "LION Navigator for Transfer to GEO Using Electric Propulsion." (Sep. 18, 2015), 18 pages, https://elib.dlr.de/100291/1/ION_15_F67_Hartrampf_LION_HEO.pdf.
(Continued)

*Primary Examiner* — John C Kuan
(74) *Attorney, Agent, or Firm* — WOMBLE BOND DICKINSON (US) LLP

(57) ABSTRACT

Machine learning techniques can be used to mitigate multipath in a GNSS receiver that includes a first trained model that provides extra path length (EPL) corrections in the GNSS receiver. The first trained model can be updated using an updated and trained model from one or more assistance servers that are in communication with the GNSS receiver. The GNSS receiver can provide, for a particular computed position and time, extracted features from received GNSS signals to the one or more assistance servers. The assistance servers can then use the extracted features and a source of true EPL corrections (e.g., from a 3D building map database for the particular computed position and time) to train a server model. The server model, once trained to a desired level of accuracy, can be transmitted to the GNSS receiver to replace the first trained model.

18 Claims, 7 Drawing Sheets

Trained model in client system

Related U.S. Application Data filed on Dec. 3, 2021, provisional application No. 63/243,028, filed on Sep. 10, 2021, provisional application No. 63/216,905, filed on Jun. 30, 2021.

(51) Int. Cl.
    *G01S 19/23*     (2010.01)
    *G01S 19/42*     (2010.01)
    *G06N 5/022*     (2023.01)

(56) References Cited

U.S. PATENT DOCUMENTS

| | | | |
|---|---|---|---|
| 9,945,956 | B2 | 4/2018 | Chhokra et al. |
| 11,275,179 | B1 | 3/2022 | Diggelen et al. |
| 11,402,514 | B2 | 8/2022 | Sun et al. |
| 2005/0134440 | A1 | 6/2005 | Breed |
| 2007/0200754 | A1 | 8/2007 | Fuchs et al. |
| 2011/0182515 | A1 | 7/2011 | Iwai et al. |
| 2012/0249367 | A1 | 10/2012 | Bryant et al. |
| 2018/0324740 | A1 | 11/2018 | Edge et al. |
| 2019/0257953 | A1* | 8/2019 | Lennen .......... G01S 19/22 |
| 2019/0384304 | A1 | 12/2019 | Towal et al. |
| 2020/0049837 | A1* | 2/2020 | Werner .......... G06N 20/20 |
| 2020/0151288 | A1 | 5/2020 | Ma et al. |
| 2020/0326430 | A1 | 10/2020 | Nichols et al. |
| 2021/0041571 | A1 | 2/2021 | Fischer et al. |
| 2021/0095965 | A1 | 4/2021 | Zhao et al. |
| 2021/0302597 | A1* | 9/2021 | Rezaei .......... G01S 19/51 |
| 2022/0066046 | A1 | 3/2022 | Diggelen et al. |
| 2022/0066048 | A1 | 3/2022 | Diggelen et al. |
| 2022/0066053 | A1 | 3/2022 | Maggiolo et al. |
| 2022/0099841 | A1 | 3/2022 | Farmer et al. |
| 2022/0107184 | A1 | 4/2022 | Omr et al. |
| 2022/0137236 | A1 | 5/2022 | Conflitti et al. |
| 2023/0057518 | A1* | 2/2023 | Chen .......... H04B 7/18556 |

FOREIGN PATENT DOCUMENTS

| | | | | |
|---|---|---|---|---|
| KR | 20200116729 | A * | 10/2020 | ........ G01S 19/20 |
| WO | 2020248200 | A1 | 12/2020 | |
| WO | 2021029869 | A1 | 2/2021 | |
| WO | WO-2021095270 | A1 * | 5/2021 | ........ G01S 19/07 |

OTHER PUBLICATIONS

Hauschild, André. "Chapter 20: Combination of Observations", in Springer Handbook of Global Navigation Satellite Systems, edited by Peter J.G. Teunissen and Oliver Montenbruck (Jul. 25, 2021), pp. 583-604, doi: 10.1007/978-3-319-42928-1.

Hoque, M. M., and N. Jakowski. "Ionospheric bending correction for GNSS radio occultation signals", Radio Science, vol. 46, RS0D06 (Jul. 6, 2011), 9 pages, doi:10.1029/2010RS004583.

Najmafshar, M. et al. "Characterizing Ionospheric Scintillation for Future GNSS Radio Occultation Missions," Proceedings of the 28th International Technical Meeting of the Satellite Division of The Institute of Navigation (Ion GNSS+ 2015), Tampa, Florida, Sep. 2015, pp. 3808-3818.

O'Brien, Andrew. "Adaptive Antenna Arrays for Precision GNSS Receivers." Doctoral dissertation, Ohio State University, 2009. http://rave.ohiolink.edu/etdc/view?acc_num=osu1259170076.

PCT International Search Report and Written Opinion from related PCT Application No. PCT/US2022/033560, mailed Nov. 4, 2022, 17 pages.

PCT International Preliminary Report on Patentability from related PCT Application No. PCT/US2022/033560, mailed Jan. 11, 2024, 13 pages.

PCT International Search Report and Written Opinion from related PCT Application No. PCT/US2022/033584, mailed Oct. 27, 2022, 11 pages.

PCT International Preliminary Report on Patentability from related PCT Application No. PCT/US2022/033584, mailed Jan. 11, 2024, 10 pages.

PCT International Preliminary Report on Patentability from related PCT Application No. PCT/US2022/033617, mailed Jan. 11, 2024, 20 pages.

Turetzky, G. et al. "A Pure L5 Mobile Receiver", Inside GNSS (Sep. 30, 2020), 4 pages, https://insidegnss.com/a-pure-l5-mobile-receiver/.

Xu, H. et al. Machine learning based LOS/NLOS classifier and robust estimator for GNSS shadow matching. Satell Navig 1:15 (May 11, 2020), 12 pages, https://doi.org/10.1186/s43020-020-00016-w.

Yuan, Zhenyu et al. "Hybrid-DNNs: Hybrid Deep Neural Networks for Mixed Inputs", May 2020, 14 pages.

Hoque, Mainul and Jakowski, N. "Estimate of higher order ionospheric errors in GNSS positioning", Radio Science, vol. 43, RS5008, doi:10.1029/2007RS003817, Oct. 9, 2008 (15 pages).

PCT International Search Report and Written Opinion from related PCT Application No. PCT/US2022/33617, mailed Sep. 12, 2022 (22 pages).

A. A. Abdallah and Z. M. Kassas, "Deep Learning-Aided Spatial Discrimination for Multipath Mitigation," 2020 IEEE/Ion Position, Location and Navigation Symposium (PLANS) (Apr. 20-23, 2020), pp. 1324-1335, doi: 10.1109/PLANS46316.2020.9109935.

F. Dovis, R. Imam, W. Qin, C. Savas and H. Visser, "Opportunistic use of GNSS Signals to Characterize the Environment by Means of Machine Learning Based Processing," ICASSP 2020-2020 IEEE International Conference on Acoustics, Speech and Signal Processing (ICASSP) (May 4-8, 2020), pp. 9190-9194, doi: 10.1109/ICASSP40776.2020.9052924.

B. Guermah, H. E. Ghazi, T. Sadiki and H. Guermah, "A Robust GNSS LOS/Multipath Signal Classifier based on the Fusion of Information and Machine Learning for Intelligent Transportation Systems," 2018 IEEE International Conference on Technology Management, Operations and Decisions (ICTMOD) (Nov. 21-23, 2018), pp. 94-100, doi: 10.1109/ITMC.2018.8691272.

L.T. Hsu, "GNSS multipath detection using a machine learning approach," 2017 IEEE 20th International Conference on Intelligent Transportation Systems (ITSC) (Oct. 2017), pp. 1-6, doi: 10.1109/ITSC.2017.8317700.

Munin, Evgenii & Blais, Antoine & Couellan, Nicolas. Convolutional Neural Network for Multipath Detection in GNSS Receivers. arXiv:1911.02347v1 [eess.SP] (Nov. 6, 2019), pp. 1-10, https://doi.org/10.48550/arXiv.1911.02347.

M. Orabi, J. Khalife, A. A. Abdallah, Z. M. Kassas and S. S. Saab, "A Machine Learning Approach for GPS Code Phase Estimation in Multipath Environments," 2020 IEEE/ION Position, Location and Navigation Symposium (PLANS), (Apr. 20-23, 2020), pp. 1224-1229, doi: 10.1109/PLANS46316.2020.9110155.

Qin, Honglei & Xue, Xia & Yang, Qian. GNSS multipath estimation and mitigation based on particle filter. IET Radar, Sonar & Navigation, vol. 13, Issue 9 (Sep. 1, 2019), pp. 1588-1596. https://doi.org/10.1049/iet-rsn.2018.5587.

Quan Y, Lau L, Roberts GW, Meng X, Zhang C. Convolutional Neural Network Based Multipath Detection Method for Static and Kinematic GPS High Precision Positioning. Remote Sensing. (Dec. 17, 2018), 10(12):2052. https://doi.org/10.3390/rs10122052.

Savas, Caner, Dovis, Fabio, "Multipath Detection based on K-means Clustering," Proceedings of the 32nd International Technical Meeting of the Satellite Division of The Institute of Navigation (Ion GNSS+ 2019), Miami, Florida (Sep. 16-20, 2019), pp. 3801-3811, https://doi.org/10.33012/2019.17028.

Suzuki, Taro, Nakano, Yusuke, Amano, Yoshiharu, "NLOS Multipath Detection by Using Machine Learning in Urban Environments," Proceedings of the 30th International Technical Meeting of the Satellite Division of The Institute of Navigation (Ion GNSS+ 2017), Portland, Oregon (Sep. 2017), pp. 3958-3967. https://doi.org/10.33012/2017.15291.

Suzuki T, Amano Y. NLOS Multipath Classification of GNSS Signal Correlation Output Using Machine Learning. Sensors. (Apr. 3, 2021), 21(7):2503. https://doi.org/10.3390/s21072503.

Yozevitch, R., Moshe, B. B., and Weissman, A. A Robust GNSS LOS/NLOS Signal Classifier. J Inst Navig, 63:429-442. (May 2016) doi: 10.1002/navi.166.

(56) References Cited

OTHER PUBLICATIONS

Examination report No. 1 from related Australian Patent Application No. 2022303020, dated Aug. 16, 2024, 4 pages.
Extended European Search Report from related European Application No. 22833895.0 mailed on Mar. 14, 2025, 10 pages.
Extended European Search Report from related European Application No. 22833893.5 mailed on Apr. 28, 2025, 10 pages.
Extended European Search Report from related European Application No. 22833897.6 mailed on Apr. 30, 2025, 11 pages.
Notice of Acceptance from related Australian Application No. 2022303020 mailed on May 1, 2025, 3 pages.

* cited by examiner

USER-AIDED SIGNAL LINE-OF-SIGHT (LOS) MACHINE LEARNING CLASSIFIER

This application claims the benefit of U.S. provisional patent application No. 63/309,280, which was filed Feb. 11, 2022 by Applicant oneNav, Inc. of Palo Alto, California and claims the benefit of U.S. provisional patent application No. 63/216,905, which was filed Jun. 30, 2021 by Applicant oneNav, Inc. of Palo Alto, California and claims the benefit of U.S. provisional patent application No. 63/243,028 which was filed on Sep. 10, 2021 by the same Applicant and claims the benefit of U.S. provisional patent application No. 63/285,823, which was filed Dec. 3, 2021 by Applicant oneNav, Inc. of Palo Alto, California, and these provisional patent applications are hereby incorporated herein by reference.

BACKGROUND

This disclosure relates to the field of systems that determine a position of a radio receiver, and in particular this disclosure relates to global navigation satellite system (GNSS) receivers, such as a GNSS receiver that can determine the position of the GNSS receiver from signals received from GNSS satellites (GNSS SVs).

It is known that multipath effects on GNSS signals can cause large errors in position calculations in GNSS receivers. Multipath effects often occur in urban canyons where the same transmitted signal from a GNSS SV is reflected multiple times off surfaces of the buildings surrounding a street where a GNSS is located; diffraction effects can also occur causing a significantly polluted signal at the receiver. For example, the GNSS receiver in this case can receive both a line of sight (LOS) signal and multiple non-line of sight (NLOS) signals from the same SV. This can distort the pseudorange measurements made in the GNSS receiver, often to the point that the GNSS receiver measures a pseudorange that has significant error, resulting in a position solution that can be in error by more than 100 meters (100 m). This inaccuracy can result in situations in which a driver of a taxi service (e.g., Uber) is directed to the wrong side of the street by the GNSS receiver of the potential passenger who is waiting for the taxi service. This problem has been studied in the GNSS field, and many solutions have been proposed.

One solution uses a classifier to classify signals as either LOS or NLOS; in this solution, the goal is to ignore or reject the NLOS signal and use only the LOS signal, if available, in the pseudorange measurement. This solution has been achieved with different approaches, including the use of machine learning (e.g., a neural network used to classify the signals). If the LOS signal is not available, then the signal is ignored (so no pseudorange measurement of the signal is provided as an output from the GNSS receiver). Another solution is described in U.S. Pat. No. 9,562,770 (inventor: Lionel J. Garin); in this approach, a signal visibility database, that contains information about the size (e.g., height, width and length) of signal obstacles (e.g., buildings in an urban canyon), is used to determine expected line of sight signals and expected NLOS signals at locations along a pathway (e.g., street in the urban canyon). This approach can use ray tracing algorithms with a 3D building map and the exact location of the SVs (at any given time) to provide location information without attempting to measure pseudoranges at the GNSS receiver.

SUMMARY OF THE DESCRIPTION

The embodiments and aspects described herein can be used to improve trained models (such as machine learning models) in GNSS receivers that provide extra path length (EPL) corrections to improve the position accuracy of position solutions for the GNSS receivers. The trained models can be improved by a set of one or more training servers that collect data from the GNSS receivers and train a server model that can replace the trained models used in the GNSS receivers. The training servers can use true EPL corrections derived from one or more three dimensional (3D) building maps that can be used to compute (e.g., through ray tracing algorithms) EPL corrections and LOS/NLOS predictions based upon the buildings' structure in an environment and the position of a GNSS receiver in the environment at any given time.

In one embodiment, a method for operating a GNSS receiver can include the following operations: receiving GNSS signals from GNSS satellites (SVs) at a first time and determining one or more pseudoranges to one or more GNSS SVs; extracting, from the received GNSS signals, features for use as inputs for a first trained model that provides extra path length (EPL) corrections; computing an output from the first trained model based on the extracted features; computing a first position from the received GNSS signals, the first position based on the output from the first trained model and the one or more pseudoranges; transmitting, to one or more first servers, the extracted features for use in obtaining an updated and trained model based on the extracted features, the computed first position and its associated first time; receiving data representing the updated and trained model; and storing the data representing the updated and trained model as a second trained model for use in providing EPL corrections when computing positions for the GNSS receiver. In one embodiment, the method can further include the operations of: requesting, by the GNSS receiver, a set of EPL corrections based on the first position and the first time; receiving by the GNSS receiver, in response to the requesting, the set of EPL corrections based on the first position and the first time; and transmitting, from the GNSS receiver, the set of EPL corrections for use in obtaining the updated and trained model. In one embodiment, the GNSS receiver discontinues use of the first trained model after storing the second trained model. In one embodiment, the method includes the further operation of: receiving a further updated model based on a region in which the GNSS receiver operates, the further updated model trained for the region.

In one embodiment, each of the one or more pseudoranges is corrected by subtracting a corresponding EPL correction from a measured pseudorange, and the measured pseudorange is measured in a delay locked loop in the GNSS receiver and wherein the one or more EPL corrections are derived based on outputs at the delay locked loop (DLL) which is a pseudorandom noise (PRN) tracking loop to track pseudoranges in the GNSS receiver and wherein the set of one or more EPL corrections correct for multipath reflections of GNSS signals in an urban canyon that surrounds the GNSS receiver.

In one embodiment, the features comprise: (1) correlation vector features from a set of successive correlation vectors from correlators, in the GNSS receiver, for GNSS signals from a GNSS SV; (2) a mutual probability distribution function (pdf) data of the relative delay and relative amplitude from each of the correlators; (3) other features relating to the GNSS receiver or GNSS SV. In one embodiment, the correlation vector features comprise one or more of: (1) relative amplitude of local maximum points in a correlation vector; (2) relative delay of peaks in a correlation vector; (3) a width of a strongest peak in a correlation vector; or (4) a number of strong peaks in a correlation vector. In one embodiment, the other features comprise one or more of: (1) an elevation of a GNSS SV; (2) a signal to noise ratio (SNR) of a measured pseudorange; (3) a type of antenna used to receive the GNSS signals; (4) a tracking mode of the GNSS receiver; or (5) a tracking loop configuration of the GNSS receiver.

According to another aspect of this disclosure, a data processing system includes a GNSS receiver and a processing system and communication transceivers, such as a cellular telephone transceiver. In one embodiment, the data processing system includes: an antenna to receive RF GNSS signals; an RF receiving section coupled to the antenna; an analog to digital (A/D) converter coupled to the RF receiving section to digitize received GNSS signals; a GNSS processing system coupled to the A/D converter, the GNSS processing system to determine one or more pseudoranges to one or more GNSS SVs and to extract, from the received GNSS signals, features for use as inputs for a first trained model that provides extra path length (EPL) corrections; and the GNSS processing system to compute an output from the first trained model based on the extracted features; and the GNSS processing system to compute a first position from the received GNSS signals, the first position based on the output from the first trained model and the one or more pseudoranges; a set of one or more communication transceivers coupled to the GNSS processing system, the set of one or more communication transceivers to transmit, to one or more first servers, the extracted features for use in obtaining an updated and trained model based on the extracted features, the computed first position and its associated first time; and the set of one or more communication transceivers to receive data representing the updated and trained model; and the GNSS processing system to store the data representing the updated and trained model as a second trained model for use in providing EPL corrections when computing positions for the GNSS receiver. In one embodiment, the set of one or more communication transceivers request a set of EPL corrections based on the first position and the first time, and the set of one or more communication transceivers receive, in response to the request, the set of EPL corrections based on the first position and the first time; and the set of one or more communication transceivers transmit the set of EPL corrections for use in obtaining the updated and trained model.

According to another aspect of this disclosure, a method of operating one or more servers that provide assistance service to one or more GNSS receivers can include the following operations: receiving, from a GNSS receiver, a set of extracted features used as inputs for a first trained model that provides extra path length (EPL) corrections in the GNSS receiver, the set of extracted features derived from GNSS signals received at the GNSS receiver and the GNSS receiver having computed a first position from the GNSS signals received at a first time by the GNSS receiver; receiving a set of EPL corrections derived from a 3D building map for the first position at the first time; training a server model using the set of EPL corrections and the set of extracted features to produce an updated trained model; and transmitting data representing the updated trained model to the GNSS receiver. In one embodiment, the set of EPL corrections is received from the GNSS receiver; in an alternative embodiment, the EPL corrections are requested by the one or more servers using a position and corresponding time (of a position fix) and received by the one or more servers from a source of true EPL corrections (e.g., a 3D building map and ray tracing processing system). In one embodiment, the method can further include the operation of: transmitting to the GNSS receiver a further updated model based on a region in which the GNSS receiver operates, the further updated model trained for the region. In one embodiment, the set of extracted features comprise: (1) correlation vector features from a set of successive correlation vectors from correlators, in the GNSS receiver, for GNSS signals from a GNSS SV; (2) a mutual probability distribution function (pdf) data of the relative delay and relative amplitude from each of the correlators; (3) other features relating to the GNSS receiver or a GNSS SV. In one embodiment, the correlation vector features comprise one or more of: (1) relative amplitude of local maximum points in a correlation vector; (2) relative delay of peaks in a correlation vector; (3) a width of a strongest peak in a correlation vector; or (4) a number of strong peaks in a correlation vector. In one embodiment, the other features comprise one or more of: (1) an elevation of a GNSS SV; (2) a signal to noise ratio (SNR) of a measured pseudorange; (3) a type of antenna used to receive the GNSS signals; (4) a tracking mode of the GNSS receiver; or (5) a tracking loop configuration of the GNSS receiver.

The aspects and embodiments described herein can include non-transitory machine readable media that can store executable computer program instructions that when executed cause one or more data processing systems (e.g., one or more GNSS processing systems in a system that includes a GNSS receiver) to perform the methods described herein when the computer program instructions are executed. The instructions can be stored in non-transitory machine readable media such as in dynamic random access memory (DRAM) which is volatile memory or in nonvolatile memory, such as flash memory or other forms of memory. The aspects and embodiments described herein can also be in the form of data processing server systems (e.g., servers in a server farm) that are built or programmed to perform these methods. The aspects and embodiments described herein can also be in the form of data processing systems, such as GNSS receivers or portions of GNSS receivers, that are built or programmed to perform these methods in a system containing the GNSS receiver. For example, a data processing system which includes a GNSS receiver, can be built with hardware logic to perform these methods or can be programmed with a computer program to perform these methods. Further, the embodiments described herein can use one or more GNSS receiver architectures (or components, methods or portions of such architectures) described in U.S. patent application Ser. No. 17/068,659, filed Oct. 12, 2020 by Paul Conflitti, et. al., with oneNav, Inc. as the Applicant and this patent application is hereby incorporated herein by reference, and this patent application was published on May 5, 2022 under publication number US 2022/0137236.

The above summary does not include an exhaustive list of all embodiments and aspects in this disclosure. All systems, media, and methods can be practiced from all suitable combinations of the various aspects and embodiments summarized above and also those disclosed in the detailed description below.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

The methods and systems described in this disclosure can use trained models to mitigate multipath effects in GNSS receivers, which can improve the accuracy of position solutions provided by such GNSS receivers in various scenarios, including for example, urban canyons that often block many GNSS signals from GNSS SVs and also cause the reflection of many GNSS signals. In one embodiment, the GNSS receivers can use a trained model that is updated through one or more assistance servers that receive training data (e.g., extracted features described below) from the GNSS receivers. The one or more assistance servers can use the training data to train one or more server models that also use true EPL corrections or LOS/NLOS predications derived from a 3D building map and ray tracing algorithms. Once the one or more assistance servers determine that the one or more server models are sufficiently trained to replace the current trained model at the GNSS receivers, the trained server models can be transmitted to the GNSS receivers to replace the currently used trained model. In one embodiment, the original and the updated trained model both provide EPL corrections to improve the position solutions for the GNSS receiver. In this description, the GNSS receivers can be considered client systems that communicate with the one or more assistance servers in order to receive the updated and trained model from the one or more assistance servers.

Figure 1A:
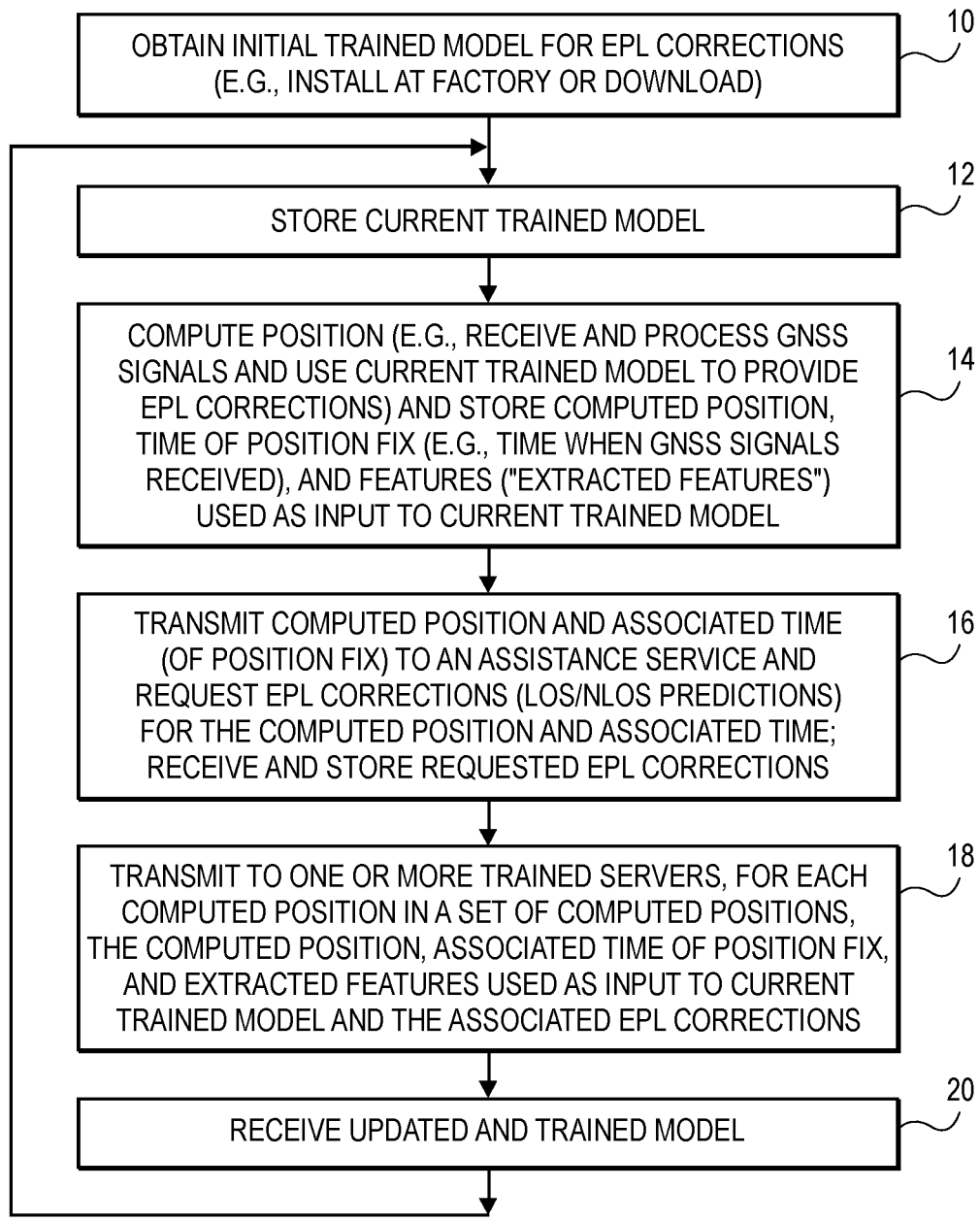
FIG. 1A is a flow chart that shows a method of operating a GNSS receiver so that it receives an updated and trained model for use in EPL corrections.

FIG. 1A shows an example of a method performed by a GNSS receiver and system containing the GNSS receiver according to one embodiment. This method can be performed by a GNSS receiver shown in FIGS. 1B and 1C. In operation 10 in FIG. 1A, a GNSS receiver can obtain an initial trained model for EPL corrections. This initial trained model can be installed or stored, in operation 12, in an integrated circuit (IC) in the GNSS receiver during fabrication of the IC or can be downloaded to the GNSS receiver after fabrication. This initial trained model can be created using one of the methods described in U.S. provisional patent application No. 63/243,028 which was filed on Sep. 10, 2021 by oneNav, Inc. For example, this initial model can be a generic model developed through the techniques described in this provisional patent application. The generic model can be based on one set of training data that is specific to a geographic region or be a model that is based on training data that is obtained across many geographic regions. The initial trained model can be designed to produce EPL corrections based on received GNSS signals as described in U.S. provisional patent application No. 63/243,028. In operation 14, a position of the GNSS receiver can be computed. For example, a GNSS receiver can receive and process GNSS signals to derive pseudoranges to the GNSS SVs that transmitted the received GNSS signals and can correct those pseudoranges based on EPL corrections from a current trained model at the GNSS receiver; further information about the correction of pseudoranges using EPL corrections is provided in U.S. provisional patent application No. 63/243,028. Also in operation 14, the GNSS receiver (or an assistance server) can determine a position (e.g., a position fix or position solution) of the GNSS receiver based on the corrected pseudoranges. Also in operation 14, the computed position solution, the time of the position solution (e.g., the time when the GNSS signals, from which the pseudoranges used in the position solution, were received) and the features (e.g., "extracted features") used an inputs to the current trained model (used for EPL corrections) in the GNSS receiver are stored so that they can be transmitted as training data for one or more server models.

In one embodiment, in operation 16 the system containing the GNSS receiver can transmit the computed position and the time of the position solution and a request for EPL corrections (or other LOS/NLOS assistance data) to an assistance server; in response to this request, the system containing the GNSS receiver can receive the requested EPL correction (from an assistance server) for the corresponding computed position and time of the position solution. It will be appreciated that, in one embodiment, the assistance server can use a 3D building map and known ray tracing algorithms to determine, based on the computed position and time of position, predictions of NLOS and LOS signals or the EPL corrections for each GNSS signal that can be received at the time of the position fix and at the computed position in the environment (e.g., an urban canyon) surrounding the computed position. Such 3D building maps and ray tracing algorithms are known in the art and can be used to compute EPL corrections or NLOS/LOS predications based on the buildings surrounding the computed position at the time of the position fix; the word "building" as used herein is meant to include a structure that can obstruct or reflect or effect a GNSS signal from a GNSS SV. Normally, the time of the position fix or time of position is the time when the GNSS signals, which were used to compute a pseudorange used in the computed position, were received. In one embodiment, the GNSS receiver (or the system containing the GNSS receiver) will store as a set of data the following data for each position solution: the computed position, the time of the position, the received EPL corrections (received in operation 16) for this combination of computed position and the time of the position, and the extracted features (described below) that were used as inputs to the current trained model which produces EPL corrections at the GNSS receiver. This stored set of data can be transmitted, either at certain times or upon request from an assistance server, to one or more assistance servers which can use this transmitted data as training data to train one or more server models. This transmission is shown as operation 18 in FIG. 1A. This transmitted data includes the training data to be used by one or more assistance servers to train a server model as described below. Once the one or more assistance servers have trained one or more server models to an adequate accuracy (e.g., an accuracy exceeding the estimated accuracy of the current trained model at the GNSS receiver), the trained server model can be transmitted to and received by the GNSS receiver. The receipt of this trained server model (which represents an updated and trained model relative to the current model at the GNSS receiver) is shown in operation 20 in FIG. 1A. The GNSS receiver can then replace the current model (used to generate EPL corrections) with the updated and trained model from the one or more assistance servers. Going forward, the GNSS receiver can use the updated and trained model instead of the prior model (at the GNSS receiver) to produce EPL corrections for the GNSS receiver.

The method shown in FIG. 1A can repeat after operation 20 by reverting back to operation 12. Over time, each GNSS receiver can update its EPL correction model multiple times by receiving updates of the trained server model over time. The server model can use crowd sourced data from a set of GNSS receivers to train the server model over time. The use of crowd sourced data over time can improve the accuracy of the server model by getting data from many GNSS receivers dispersed over a geographic region. The one or more assistance servers can know the location of the GNSS receivers (based on the received computed position of the GNSS receiver), so training (as described below) can be region specific and the GNSS receiver can receive an updated and trained model that was trained using training data from only the specific region. This can improve the accuracy of the EPL corrections from a region specific trained server model.

Figure 1B:
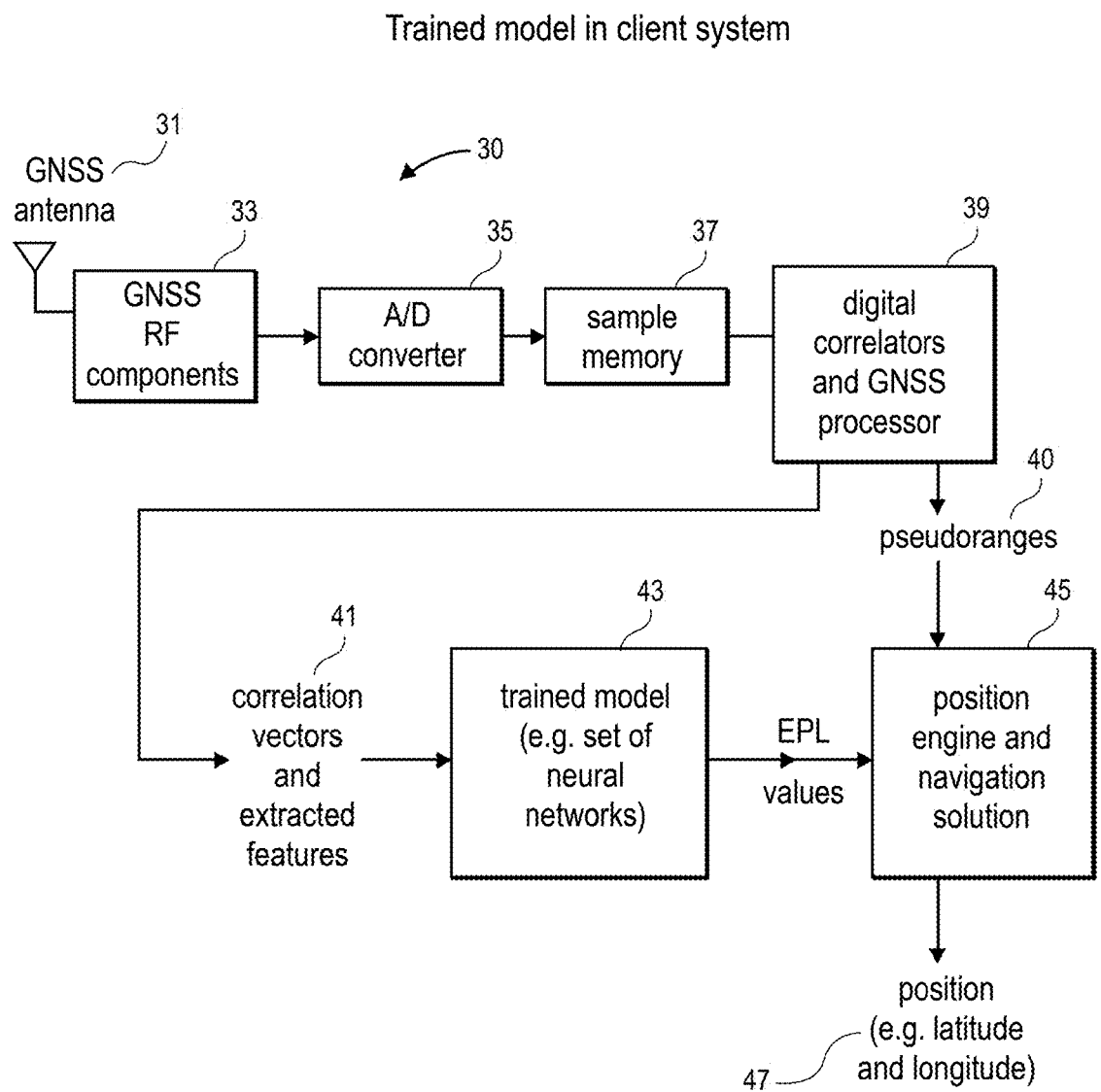
FIG. 1B shows an example of a GNSS receiver that includes trained model that provides EPL corrections.
Figure 1C:
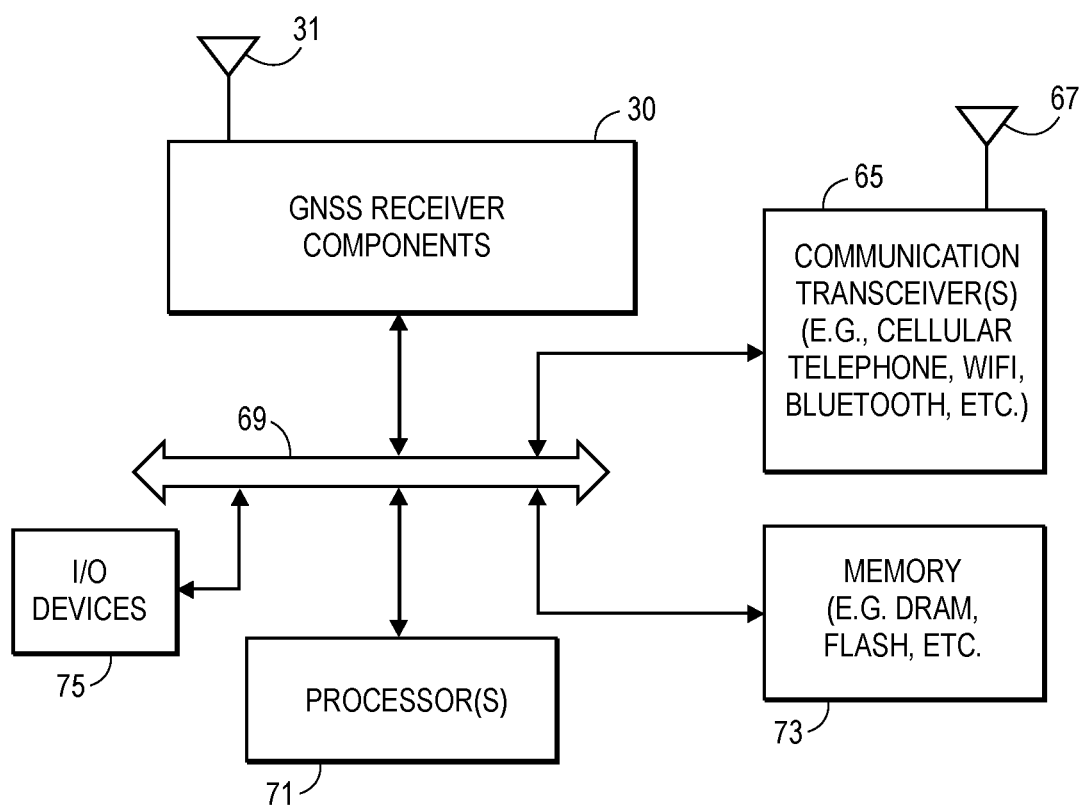
FIG. 1C shows an example of a data processing system (e.g., a smart phone or a wearable device) that includes a GNSS receiver according to one embodiment.

FIGS. 1B and 1C show an example of an embodiment of a GNSS receiver and a system containing the GNSS receiver. This example can be used to perform the methods described herein, such as the method shown in FIG. 1A, in a system containing a GNSS receiver. The GNSS receiver 30 in FIG. 1B includes a trained model 43 that can be used to correct pseudorange measurements made through the GNSS receiver's pseudorange measurement system, such as the GNSS receiver's DLL (delay lock loop). The GNSS receiver 30 in FIG. 1B includes a GNSS antenna 31 (e.g., a linear polarized antenna) that provides received GNSS signals to RF (radio frequency) circuitry in GNSS RF components 33; these RF components can filter and amplify the received GNSS signals as in known in the art. The amplified GNSS signals are then digitized in the analog-to-digital (A/D) converter 35, and the digitized GNSS signals are stored in sample memory 37 for processing by the digital correlators and GNSS processor 39. The digital correlators include, in one embodiment, a DLL that tracks pseudoranges for each of the received channels of the GNSS signals; this DLL can be a conventional DLL that is known in the art. The DLL produces measured pseudoranges 40 to the position engine 45 which computes a navigation solution (e.g., a computed position) based on the measured pseudoranges (as corrected by the EPL corrections from the trained model 43). In this example in FIG. 1B, the GNSS receiver uses a DLL for a pseudorange measurement system. As is known in the art, a pseudorange measurement system in a GNSS receiver can have one or both of a closed loop system, such as a DLL, and an open loop system such as an open loop estimation algorithm. When both are present in a GNSS receiver, they can be used at different times depending on the state of PRN acquisition in the GNSS receiver. Open loop measurement quality is usually less accurate than a closed tracking loop, but open loop measurements are usually faster, so open loop measurement is typically used for fast (re)acquisition of the PRN code phase and initial internal PRN code phase injection into the closed loop, then the mode is switched from open loop to a closed loop when the closed loop has converged. An open loop measurement algorithm is also continually used when the SNR is too low for a tracking loop to function properly.

The position engine 45 can be conventional position engine that generates a navigation solution (also referred to as a computed position) such as a position 47 in latitude, longitude and altitude, although the position engine will use the EPL value for the current measured pseudorange to correct the pseudorange before using the pseudorange in the engine. The DLL (or other pseudorange measurement system) will provide measured pseudoranges for each GNSS signal being estimated by the pseudorange measurement system as is known in the art, and the trained model 43 can provide EPL correction values based upon the inputs 41 to the trained model 43. Each of these inputs 41 over time will be based upon the current GNSS signal that produces the current measured pseudorange for the GNSS signal. In one embodiment, the inputs 41 can include a mutual probability distribution function (pdf) (e.g., plot 151 shown in provisional patent application No. 63/243,028 which was filed on Sep. 10, 2021), the extracted other features (e.g., other features 131 shown in provisional patent application No. 63/243,028, such as one or more of: (1) an elevation of a GNSS SV; (2) a signal to noise ratio (SNR) of a measured pseudorange; (3) a type of antenna used to receive the GNSS signals; (4) a tracking mode of the GNSS receiver; or (5) a tracking loop configuration of the GNSS receiver), the correlation vectors (e.g., a burst of correlation vectors 133 shown in provisional patent application No. 63/243,028) and the extracted features based on the correlation vectors (e.g., relative amplitude of local maximum points in the correlation vectors, the relative delay of the peaks in the correlation vector, the width of the strongest peak in the correlation vector, and the number of strong peaks in the correlation vector). The GNSS processor 39 can perform operations to create these inputs 41 (as described in provisional patent application No. 63/243,028) for a given digitized GNSS signal. Generally, the inputs to the model 43 will be processed during inference time (when the trained model is used) in the same way that the inputs were processed during training of the model. The inputs 41 can be the same as the extracted features transmitted in operation 18 in FIG. 1A to one or more assistance servers; in other words, these inputs 41 can be the server training data transmitted to the one or more assistance servers for each computed position used by the one or more servers during training of the server model. The trained model 43 is the model in the GNSS receiver that is replaced by an updated and trained server model that is received by the GNSS receiver through one or more communication transceivers as described below.

The GNSS receiver 30 in FIG. 1B can be part of a system that includes one or more communication transceivers; an example of such a system is shown in FIG. 1C. The GNSS receiver 30 can be coupled to the rest of the system through one or more buses (e.g., bus 69) as is known in the art. The system shown in FIG. 1C also includes one or more processors (e.g., one or more processors 71) which may be the one or more application processors used in a mobile device such as a smart phone. The system may also include other processors as is known in the art. The system can also include input/output (I/O) devices 75, such as touch screens, audio I/O, haptic devices, etc. The system also includes memory 73 which can include DRAM and non-volatile memory such as flash memory, etc. This memory 73 can store computer program instructions which cause the system to operation according to one or more embodiments described herein. The system also includes one or more communication transceivers 65 that may use one or more antennas, such as antenna 67. The communication transceiver 65 can include one or more of: a cellular telephone wireless transceiver, a WiFi transceiver, a Bluetooth transceiver, a WiMax transceiver, and other types of communication transceivers that are known in the art. The system shown in FIG. 1C can be a smart phone or a wearable device (e.g., smartwatch or head worn device) or a tablet computer or a portable consumer electronic device or other types of electronic devices. In one embodiment, the system shown in FIG. 1C can be integrated into a vehicle such as an automobile to provide navigation for the vehicle; in one embodiment, the vehicle may include the ability for autonomous driving using the navigation provided by the integrated system. The communication transceiver 65 allows the GNSS receiver to communicate with one or more assistance servers to perform the methods described herein. For example, the GNSS receiver 30 can cause the transmission of the server training data in operation 18 in FIG. 1A to one or more assistance servers through the communication transceiver 65, and the GNSS receiver 30 can receive the updated and trained server model in operation 20 in FIG. 1A through the communication transceiver 65. The communication transceiver 65 allows the GNSS receiver 30 operate with the one or more assistance servers through one or more networks as shown in FIG. 1D.

Figure 1D:
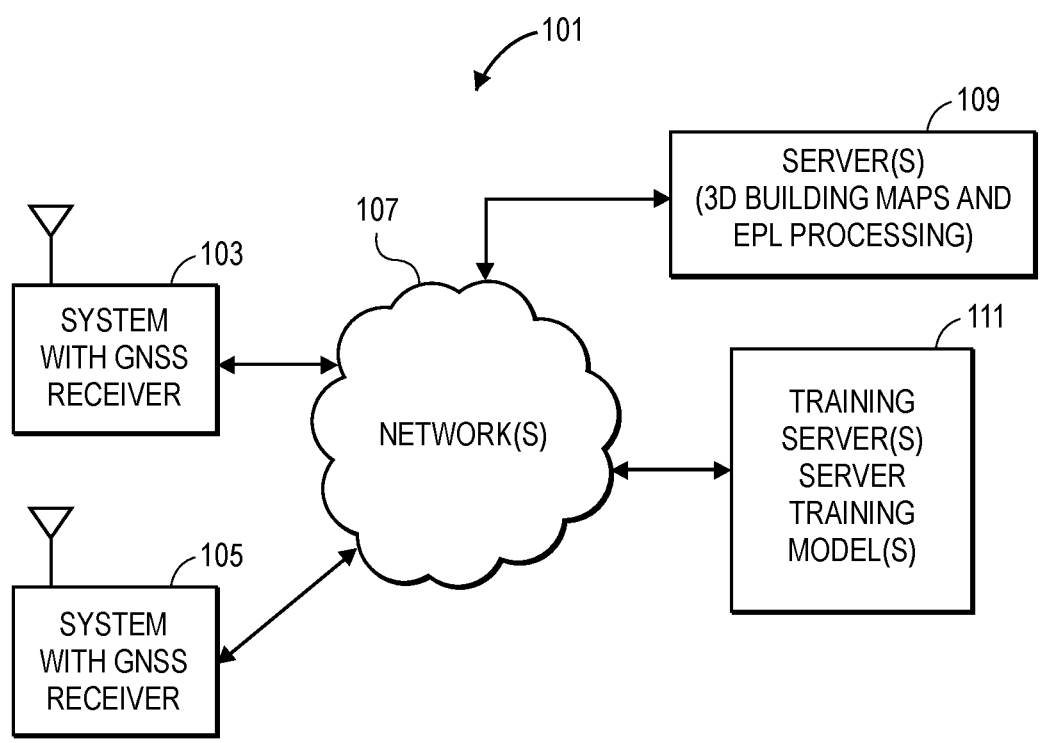
FIG. 1D shows an example of a system of assistance servers that can be used to provide an updated and trained model for use in EPL corrections.

FIG. 1D shows an example of a networked system 101 that includes several assistance server systems 109 and 111 and at least two GNSS receivers 103 and 105 (each of which can be the same as the system shown in FIG. 1C). In one embodiment, the networked system 101 can include many millions of GNSS receivers (each of which is part of a system as shown in FIG. 1C). These GNSS receivers can be dispersed over one or more large geographic regions (e.g., North America, South America, Africa, Europe, Asia, etc.). Each of the GNSS receivers 103 and 105 (through their respective communication transceivers) can communicate with the one or more servers 109 and 111 through one or more networks 107 using communication methods that are known in the art. For example, the GNSS receivers 103 and 105 can cause the transmission of the server training data in operation 18 in FIG. 1A to one or more assistance servers 111 through the one or more networks 107, and the GNSS receivers 103 and 105 can receive the updated and trained server model in operation 20 in FIG. 1A from the one or more assistance servers 111 through the one or more networks 107. Further, the GNSS receivers 103 and 105 can cause the transmission of a computed position and associated time of position in operation 16 in FIG. 1A to the one or more assistance servers 109 through the one or more networks 107, and the GNSS receivers 103 and 105 can receive the requested EPL corrections (or other NLOS/LOS predictions) in operation 16 from the one or more assistance servers 109 through the one or more networks 107. The one or more networks 107 can include one or more cellular telephone networks, one or more wired telephone networks, one or more wired Ethernet networks, one or more optical fiber networks, one or more WiFi networks, the internet, and one or more other networks and communication media known in the art.

The one or more assistance servers 109 can include a database of 3D building maps or models that represent the size (e.g., height, width and length) and locations of buildings in an environment surrounding a GNSS receiver; such 3D building maps or models are known in the art and can be used with known ray tracing algorithms to calculate EPL corrections for pseudorange measurements for a given position and time of position in the environment. The environment can be a portion of a city or urban region. The provisional patent application No. 63/243,028 which was filed on Sep. 10, 2021 describes an example of an approach that can produce EPL corrections (for a given position and time of position in an environment) from a database of 3D building maps and ray tracing algorithms. The one or more assistance servers 109 can compute such EPL corrections in response to a request from a GNSS receiver (e.g., GNSS receivers 103 or 105) in an embodiment using operation 16 in FIG. 1A or in response to a request from a server in the one or more assistance servers 111. The one or more assistance servers 109 can, after computing the EPL corrections (for a given position and time of position in an environment), transmit the requested EPL corrections to the GNSS receiver which requested the EPL corrections (in the case of an embodiment that uses operation 16 in FIG. 1A) or transmit the requested EPL corrections to an assistance server that is part of the one or more assistance servers 111. The requested EPL corrections can be used as a source of truth data when the one or more assistance servers 111 are training a server model. This training is described further below in conjunction with FIGS. 2A and 2B.

Figure 2A:
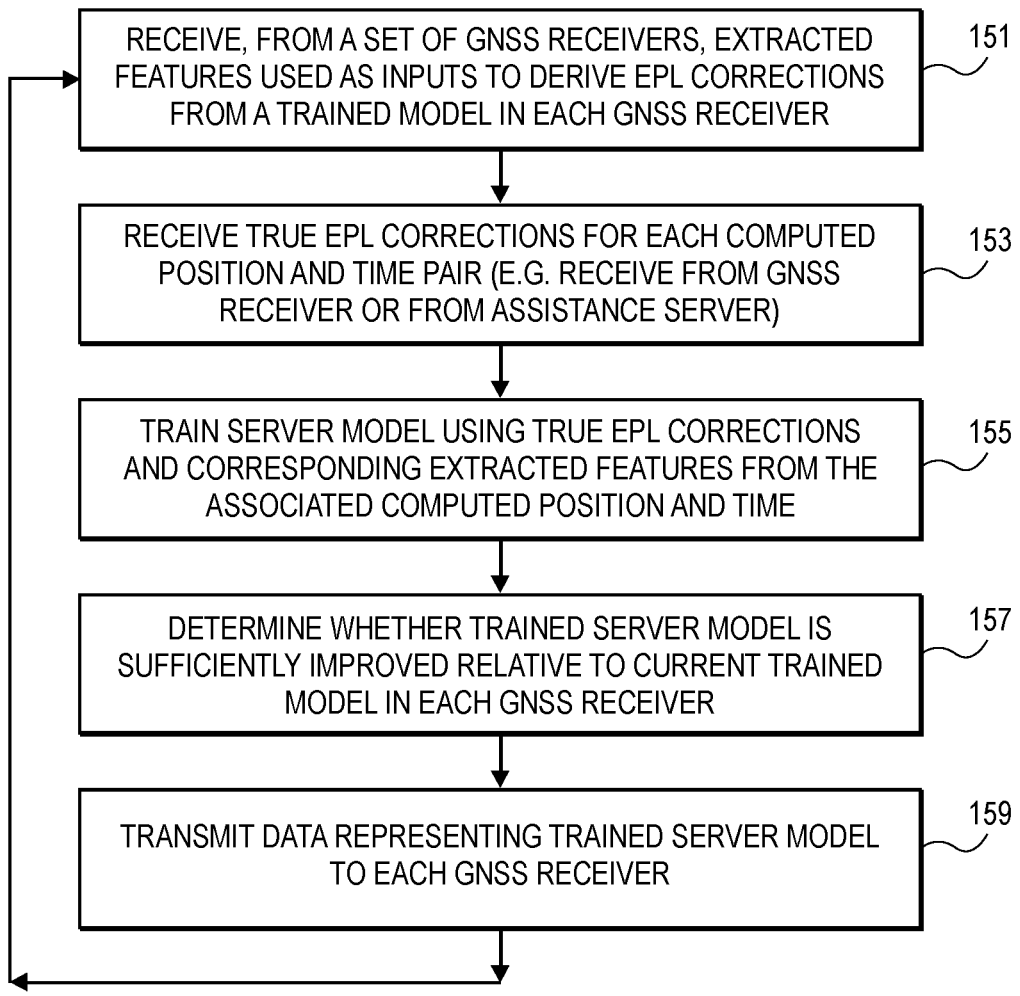
FIG. 2A is a flowchart that shows a method of operating one or more assistance servers to provide an updated and trained model for use in EPL corrections.

FIG. 2A shows an example of a method of operating a training server which can be one of the assistance servers 111. In operation 151, a training server can receive (from a GNSS receiver that is performing operation 18 in FIG. 1A) extracted features that may have been used as inputs to a trained model (at the GNSS receiver); in one embodiment, the extracted features were used by the trained model at the GNSS receiver to derive EPL corrections for use in determining the computed position of the GNSS receiver. These extracted features can include a set of data for the computed position and time of position, and this set of data can include, for example: a mutual pdf; a burst of correlation vectors used in determining the computed position; extracted features from the correlation vectors (e.g., one or more of: (1) relative amplitude of local maximum points in a correlation vector; (2) relative delay of peaks in a correlation vector; (3) a width of a strongest peak in a correlation vector; or (4) a number of strong peaks in a correlation vector); and other features such as: one or more of: (1) an elevation of a GNSS SV; (2) a signal to noise ratio (SNR) of a measured pseudorange; (3) a type of antenna used to receive the GNSS signals; (4) a tracking mode of the GNSS receiver; or (5) a tracking loop configuration of the GNSS receiver. Generally, the same categories of data used at inference time will be used to train a model, and these categories of data will be included in the set of data received in operation 151 (for each pair of computed position and time of position). Further details about the extracted features that can be received in operation 151 are provided in U.S. provisional patent application No. 63/243,028 which was filed on Sep. 10, 2021. In one embodiment, the receipt of training data in operation 151 is the result of the transmission of data in operation 18 in FIG. 1A. In operation 153, the training server can receive true EPL corrections for each pair of computed position and time of position; in an embodiment based on operation 16 in FIG. 1A, the training server receives the true EPL corrections from the GNSS receiver (which had previously obtained them from assistance servers 109). In an alternative embodiment, the training server can use the pair of computed position and time of position (received from the GNSS receiver) to request the true EPL corrections from the one or more assistance servers 109. Once the input data (e.g., extracted features) is received in operation 151 and the truth data has been received in operation 153, the one or more training servers can train one or more training models in operation 155. Operation 155 will typically involve a large set of training epochs using a large set of training data, such as data from a large set of pairs of computed positions and associated times from multiple GNSS receivers dispersed over one or more geographic regions.

Figure 2B:
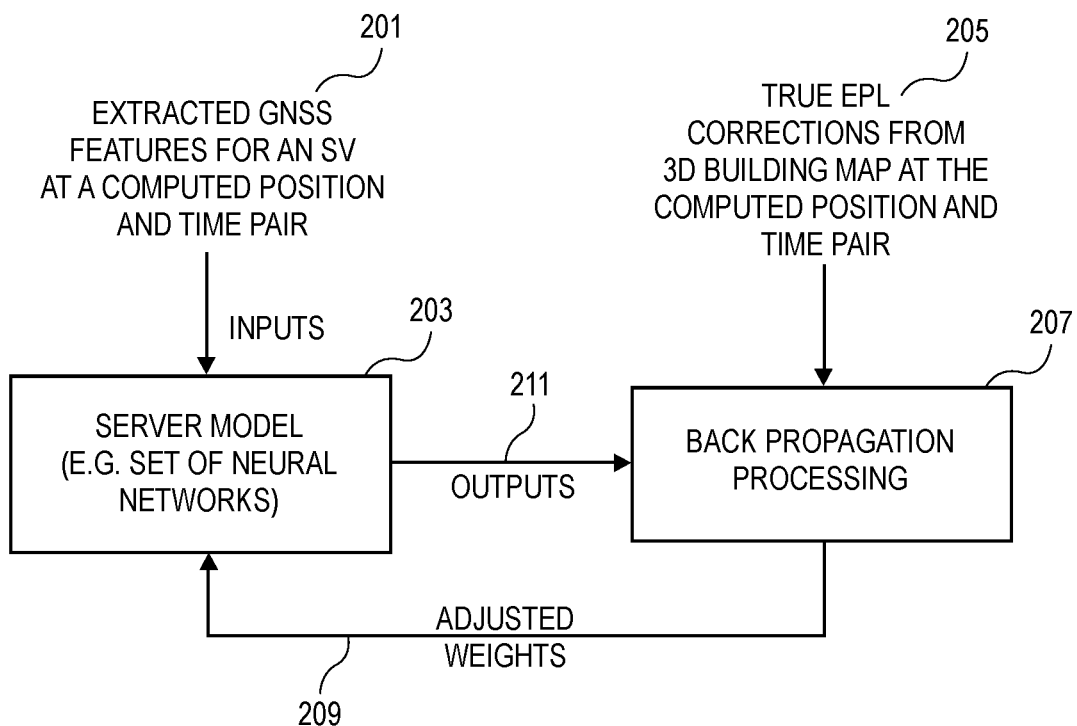
FIG. 2B shows an example of a system that can be used to train a server model in order to provide an updated and trained model for use in EPL corrections.

FIG. 2B shows an example of a system for training a server model 203 according to one embodiment. In one embodiment, the architecture of the model used at the training server will be the same as the architecture of the model used at the GNSS receiver. In one embodiment, the model can be a set of neural networks such as those described in U.S. provisional patent application No. 63/243, 028 which was filed on Sep. 10, 2021. In one embodiment, the set of neural networks can include: (1) a first convolution neural network (CNN) to receive as inputs the mutual pdf data; (2) a second CNN to receive as inputs the correlation vector features; and (3) another neural network to receive the other features. The model 203 receives, for each pair of computed position and time of position, features 201; the data in the features 201 are the data received in operation 151 described above. This data in features 201 can be referred to as training data (to train the server model) and can represent the actual data used as inputs by the GNSS receiver's trained model when it determined the computed position. The server model 203 produces outputs 211 in response to the inputs 201. These outputs are then processed by back propagation processing 207, which in effect compares the true EPL corrections 205 (received in operation 153 for the same pair of computed position and time that produced the features 201) to the outputs 211. The comparison by the back propagation processing 207 can produce a set of adjust weights 209 that are back propagated through the set of neural networks in the server model 203. The server model can be trained using sets of data from many different computed positions from a GNSS receiver and can be trained using sets of data from many different GNSS receivers dispersed over one or more geographic regions. Hence, the training data for the server model can be referred to as crowd sourced training data because it can come from many different GNSS receivers. The server model before training begins in operation 155 can either start from the state of the weights of the current trained model at the GNSS receivers or can start from scratch (with initialized weights that have not been previously trained).

The training in operation 155 can continue over time until a manual or automatic decision is made to stop training in operation 157. In one embodiment, operation 157 determines whether the accuracy or performance of the server trained model sufficiently exceeds the accuracy or performance of the current trained model at the GNSS receivers. The accuracy or performance can be measured by comparing computed positions determined with the current trained model for GNSS receivers at known, predetermined locations to computed positions determined from the trained server model at the same known, predetermined locations. If the accuracy or performance is not sufficient improved, then training can continue in operation 155. On the other hand, if the accuracy or performance of the server model is sufficiently better than the current trained model in the GNSS then the trained server model can be transmitted in operation 159 to each GNSS receiver. This transmission in operation 159 causes the reception in operation 20 in FIG. 1A. After operation 159, the method in FIG. 2A can revert back to operation 151 to start a new cycle of training a new server model. The reversion back to operation 151 can be immediate or can wait a period of time (e.g., an intentional delay). The delay in this reversion can allow for updates to the 3D building maps (e.g., updates to account for buildings being demolished and new buildings being erected, corrections to building positions, sizes, etc.). Thus, the delay can be weeks or months.

The training server can decide how much training data to accept and process; this decision can be referred to as throttling of the training data. The training server can throttle by keeping and training on only a small percentage of the received training data; this throttling can occur by lack of bandwidth (such that training data is ignored) or by voluntary discarding of data (while trying to keep the training data at about the same density over each region covered by the training server) or by pruning out bad data (that would bias the training), or redundant data (e.g., no need to keep all data from a static receiver, that will be highly similar every second).

Figure 3:
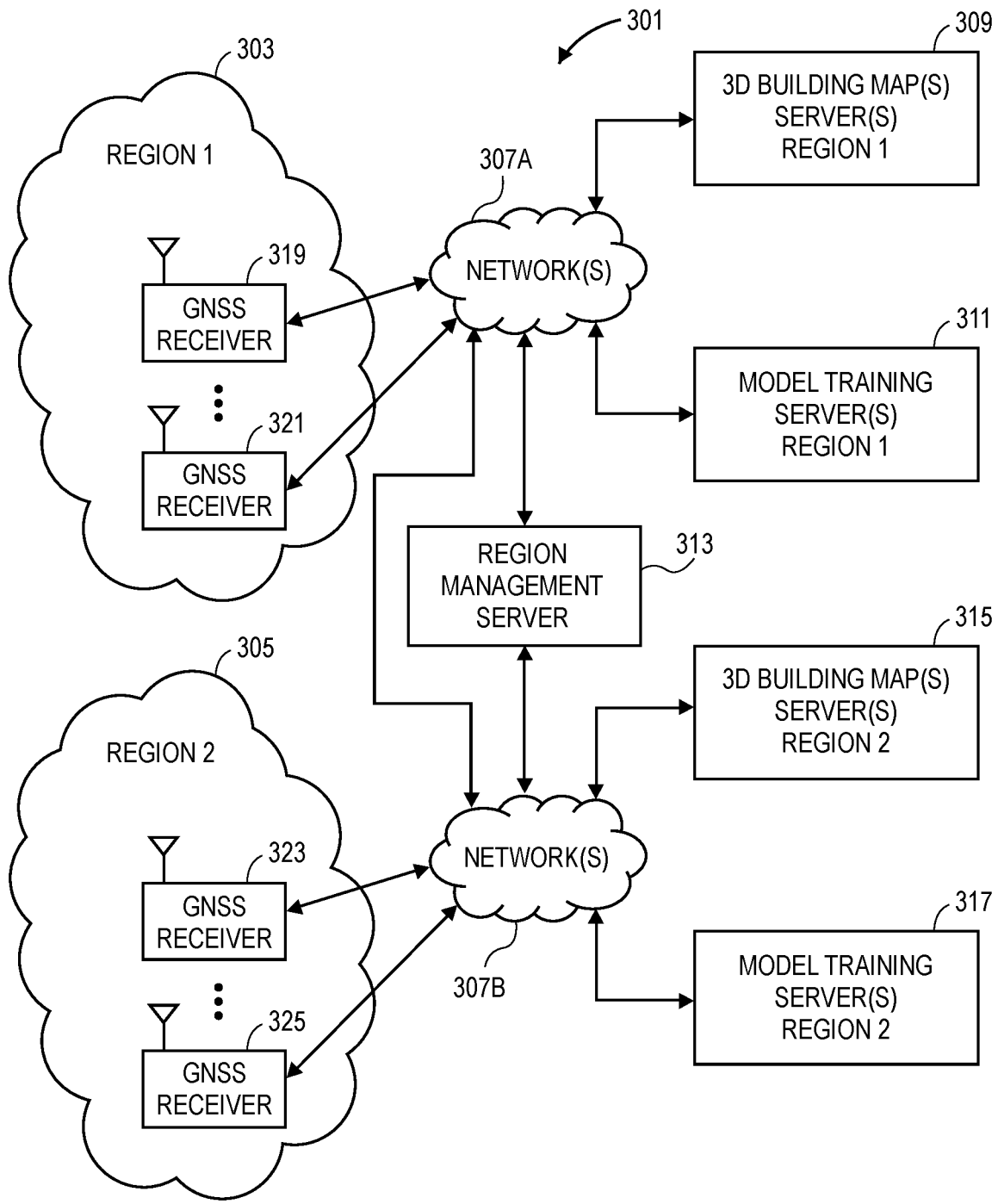
FIG. 3 shows an example of an assistance system that is divided into geographic regions to provide region specific updated and trained models for use in EPL corrections in GNSS receivers located in different regions.

In one embodiment, different training data and different trained models can be used for different geographic regions. For example, one set of training data and server model for Tokyo, Japan (other very dense urban areas) might be used for GNSS receivers in such areas while another set of training data and server model for a predominately rural area (e.g., rural areas in the United Kingdom) can be used for GNSS receivers in the predominately rural area. In this embodiment, multiple different server models are trained with region specific training data transmitted from GNSS receivers in those regions. An example of this embodiment is shown in FIG. 3. The system 301 provides a training service for 2 geographic regions, although this can be expanded to many regions. For example, there may be separate regions for each very dense urban area (e.g., New York, NY [Manhattan], Tokyo Japan, etc.) and other regions for suburban regions, etc. Each region can have its own 3D building map and training server(s). For example, as shown in FIG. 3, the region 303 uses a 3D building map (and EPL correction processing) server 309 and a model training server 311 for GNSS receivers physically located in region 303 (such as GNSS receivers 319 and 321, each of which can be similar to the system shown in FIG. 1C). Thus, training data from GNSS receivers 319 and 321 is transmitted to training server 311 to train the server model that is specific to region 303, and the true EPL corrections are obtained from the server 309 for region 303 so that the training server 311 can train a server model that is specific to region 303; the updated and trained server model created by training server 311 is downloaded to GNSS receivers in region 303 (but not GNSS receivers in region 305). Training data from GNSS receivers 323 and 325 is transmitted to training server 317 to train the server model that is specific to region 305, and the true EPL corrections are obtained from the server 315 for region 305 so that the training server 317 can train a server model that is specific to region 305; the updated and trained server model created by training server 317 is downloaded to GNSS receivers in region 305 (but not GNSS receivers in region 303). If a GNSS receiver migrates to region 303 from another region, it can request the latest trained server model from training server 311 (and can discard or discontinue use of its prior trained model for another region). Region management server 313 may be used to facilitate this change in the model in a GNSS receiver when the GNSS receiver moves from one region to another region (e.g., by directing the GNSS receiver to the appropriate URL for the new region). The various components of the system 301 can be coupled for communication through one or more networks 307A and 307B. The region management server 313 may also be used to direct the training data to the appropriate training server based on the location of the GNSS receiver that provided the training data. Each of the GNSS receivers 319, 321, 323, and 325 can perform the method shown in FIG. 1A while in their respective region, and each of the server systems in FIG. 3 can perform their respective operations described above for their respective regions. It will be appreciated that the different server systems may be consolidated such that a set of servers provide assistance services to multiple regions concurrently.

The methods described herein can be extended to the prediction of the satellite Tracking Biases from the measured sampled correlation vectors. Satellite Tracking Bias can be defined as the difference between LOS Channel Impulse Response (CIR) peak position and the tracking point of the tracking loop in the correlation delay domain. This tracking point is of course incorrect in presence of Multipath (but could be marginally improved using classical signal processing related Multipath Mitigation techniques). In this embodiment, the embedded ML engine predicts the Tracking Biases from the shape of the correlation vector over a burst (short time sequence of complex correlation vectors sampled in the correlation delay domain). The information from the assistance service is now a predicted CIR that can be used for training a correlation to Tracking Bias machine learning engine or model. The methods and systems described herein can also be extended to provide updated models used to predict range rate errors based upon the methods and systems described in U.S. provisional patent application No. 63/285,823, which was filed Dec. 3, 2021 by Applicant oneNav, Inc. of Palo Alto, California While this description has focused on GNSS SVs and GNSS signals from GNSS SVs, the embodiments described herein can also be used with GNSS-like signals from terrestrial (e.g., ground based) transmitters of GNSS-like signals, such as pseudolites ("pseudo-satellite"). Thus, the embodiments described herein can be used in systems that use such terrestrial transmitters and receivers designed to receive and process GNSS-like signals from such terrestrial transmitters. The phrase "GNSS signals" will be understood to include such GNSS-like signals, and the phrase "GNSS SVs" will be understood to include such terrestrial transmitters.

What is claimed is:

1. A method of operating a global navigation satellite system (GNSS) receiver, the method comprising:
   receiving GNSS signals from GNSS satellites (SVs) at a first time and determining one or more pseudoranges to one or more GNSS SVs;
   extracting, from the received GNSS signals, features for use as inputs for a first trained model that provides extra path length (EPL) corrections;
   computing an output from the first trained model based on the extracted features;
   computing a first position from the received GNSS signals, the first position based on the output from the first trained model and the one or more pseudoranges;
   transmitting, to one or more first servers, the extracted features for use in obtaining an updated and trained model based on the extracted features, the computed first position and its associated first time;
   receiving data representing the updated and trained model; and
   storing the data representing the updated and trained model as a second trained model for use in providing EPL corrections when computing positions for the GNSS receiver.

2. The method as in claim 1, wherein the method further comprises:
   requesting a set of EPL corrections based on the first position and the first time.

3. The method as in claim 2, wherein the method further comprises:
   receiving, in response to the requesting, the set of EPL corrections based on the first position and the first time.

4. The method as in claim 3, wherein the method further comprises:
   transmitting the set of EPL corrections for use in obtaining the updated and trained model.

5. The method as in claim 4, wherein the GNSS receiver discontinues use of the first trained model after storing the second trained model.

6. The method as in claim 1, wherein the method further comprises:
   receiving a further updated model based on a region in which the GNSS receiver operates, the further updated model trained for the region.

7. The method as in claim 1, wherein each of the one or more pseudoranges is corrected by subtracting a corresponding EPL correction from a measured pseudorange, and wherein the measured pseudorange is measured in a delay locked loop in the GNSS receiver and wherein the corresponding EPL correction is derived based on outputs at the delay locked loop (DLL) which is a pseudorandom noise (PRN) tracking loop to track pseudoranges in the GNSS receiver and wherein the corresponding EPL correction corrects for multipath reflections of GNSS signals in an urban canyon that surrounds the GNSS receiver.

8. The method as in claim 7, wherein the features comprise: (1) correlation vector features from a set of successive correlation vectors from correlators, in the GNSS receiver, for GNSS signals from a GNSS SV; (2) a mutual probability distribution function (pdf) data of relative delay and relative amplitude from each of the correlators; and (3) other features relating to the GNSS receiver or GNSS SV.

9. The method as in claim 8, wherein the correlation vector features comprise one or more of: (1) relative amplitude of local maximum points in a correlation vector; (2) relative delay of peaks in a correlation vector; (3) a width of a strongest peak in a correlation vector; or (4) a number of strong peaks in a correlation vector.

10. The method as in claim 9, wherein the other features comprise one or more of: (1) an elevation of a GNSS SV; (2) a signal to noise ratio (SNR) of a measured pseudorange; (3) a type of antenna used to receive GNSS signals; (4) a tracking mode of the GNSS receiver; or (5) a tracking loop configuration of the GNSS receiver.

11. A data processing system that comprises a global navigation satellite system (GNSS) receiver, the data processing system comprising:
an antenna to receive RF GNSS signals;
an RF receiving section coupled to the antenna;
an analog to digital (A/D) converter coupled to the RF receiving section to digitize received GNSS signals;
a GNSS processing system coupled to the A/D converter, the GNSS processing system to determine one or more pseudoranges to one or more GNSS SVs and to extract, from the received GNSS signals, features for use as inputs for a first trained model that provides extra path length (EPL) corrections; and the GNSS processing system to compute an output from the first trained model based on the extracted features; and the GNSS processing system to compute a first position from the received GNSS signals, the first position based on the output from the first trained model and the one or more pseudoranges; and
a set of one or more communication transceivers coupled to the GNSS processing system, the set of one or more communication transceivers to transmit, to one or more first servers, the extracted features for use in obtaining an updated and trained model based on the extracted features, the computed first position and its associated first time; and the set of one or more communication transceivers to receive data representing the updated and trained model; and the GNSS processing system to store the data representing the updated and trained model as a second trained model for use in providing EPL corrections when computing positions for the GNSS receiver.

12. The data processing system as in claim 11, wherein the set of one or more communication transceivers request a set of EPL corrections based on the first position and the first time, and the set of one or more communication transceivers receive, in response to the request, the set of EPL corrections based on the first position and the first time; and the set of one or more communication transceivers transmit the set of EPL corrections for use in obtaining the updated and trained model.

13. A non-transitory machine readable medium storing executable program instructions which when executed by a data processing system cause the data processing system to perform a method, the method comprising:

receiving global navigation satellite system (GNSS) signals from GNSS satellites (SVs) at a first time and determining one or more pseudoranges to one or more GNSS SVs;

extracting, from the received GNSS signals, features for use as inputs for a first trained model that provides extra path length (EPL) corrections;

computing an output from the first trained model based on the extracted features;

computing a first position from the received GNSS signals, the first position based on the output from the first trained model and the one or more pseudoranges;

transmitting, to one or more first servers, the extracted features for use in obtaining an updated and trained model based on the extracted features, the computed first position and its associated first time;

receiving data representing the updated and trained model; and storing the data representing the updated and trained model as a second trained model for use in providing EPL corrections when computing positions for the GNSS receiver.

14. The non-transitory machine readable medium as in claim 13, wherein the GNSS receiver discontinues use of the first trained model after storing the second trained model.

15. The non-transitory machine readable medium as in claim 14, wherein the method further comprises:
receiving a further updated model based on a region in which the GNSS receiver operates, the further updated model trained for the region.

16. The non-transitory machine readable medium as in claim 14, wherein the features comprise: (1) correlation vector features from a set of successive correlation vectors from correlators, in the GNSS receiver, for GNSS signals from a GNSS SV; (2) a mutual probability distribution function (pdf) data of relative delay and relative amplitude from each of the correlators; and (3) other features relating to the GNSS receiver or GNSS SV.

17. The non-transitory machine readable medium as in claim 16, wherein the correlation vector features comprise one or more of: (1) relative amplitude of local maximum points in a correlation vector; (2) relative delay of peaks in a correlation vector; (3) a width of a strongest peak in a correlation vector; or (4) a number of strong peaks in a correlation vector.

18. The non-transitory machine readable medium as in claim 17, wherein the other features comprise one or more of: (1) an elevation of a GNSS SV; (2) a signal to noise ratio (SNR) of a measured pseudorange; (3) a type of antenna used to receive GNSS signals; (4) a tracking mode of the GNSS receiver; or (5) a tracking loop configuration of the GNSS receiver.

* * * * *